United States Patent [19]

Jolly et al.

[11] Patent Number: 4,663,117
[45] Date of Patent: May 5, 1987

[54] NUCLEAR REACTOR FUEL ASSEMBLIES

[75] Inventors: Robert Jolly, Freckleton; Colin E. Butterfield, Westhoughton, both of England

[73] Assignee: Secretary of State for United Kingdom Atomic Energy Authority, London, England

[21] Appl. No.: 694,232

[22] Filed: Jan. 24, 1985

[30] Foreign Application Priority Data

Feb. 28, 1984 [GB] United Kingdom ................. 8405105

[51] Int. Cl.⁴ .............................................. G21C 3/34
[52] U.S. Cl. .................................... 376/442; 376/438; 376/462
[58] Field of Search ........................ 376/438, 442, 462

[56] References Cited

U.S. PATENT DOCUMENTS

| | | | |
|---|---|---|---|
| 3,301,764 | 1/1967 | Timbs et al. | 376/442 |
| 3,317,399 | 5/1967 | Winders | 376/438 |
| 3,356,582 | 12/1967 | Saunders | 376/438 |
| 4,056,441 | 11/1977 | Marmonier et al. | 376/438 |

FOREIGN PATENT DOCUMENTS

| | | |
|---|---|---|
| 873073 | 7/1961 | United Kingdom . |
| 944699 | 12/1963 | United Kingdom . |
| 1137621 | 12/1968 | United Kingdom . |
| 1190409 | 5/1970 | United Kingdom . |
| 1204351 | 9/1970 | United Kingdom . |
| 1255978 | 12/1971 | United Kingdom . |
| 2079033 | 1/1982 | United Kingdom . |
| 2133918 | 8/1984 | United Kingdom . |

Primary Examiner—Deborah L. Kyle
Assistant Examiner—Richard W. Wendtland
Attorney, Agent, or Firm—William R. Hinds

[57] ABSTRACT

A nuclear reactor fuel of the kind comprising multi-pins (10) located in a hexagonal wrapper (11) and stabilized by a series of spacing grids (12) has an internal grid support cage (13) formed by six vertical limbs (20) inside the wrapper. The limbs of the cage have upturned parts (14) which engage into the cellular structure of the grids such as lying between two adjacent unit cells (16). The cells have tabs (21 in FIG. 3 and 52 in FIG. 5) which can be welded to the upturned parts.

17 Claims, 11 Drawing Figures

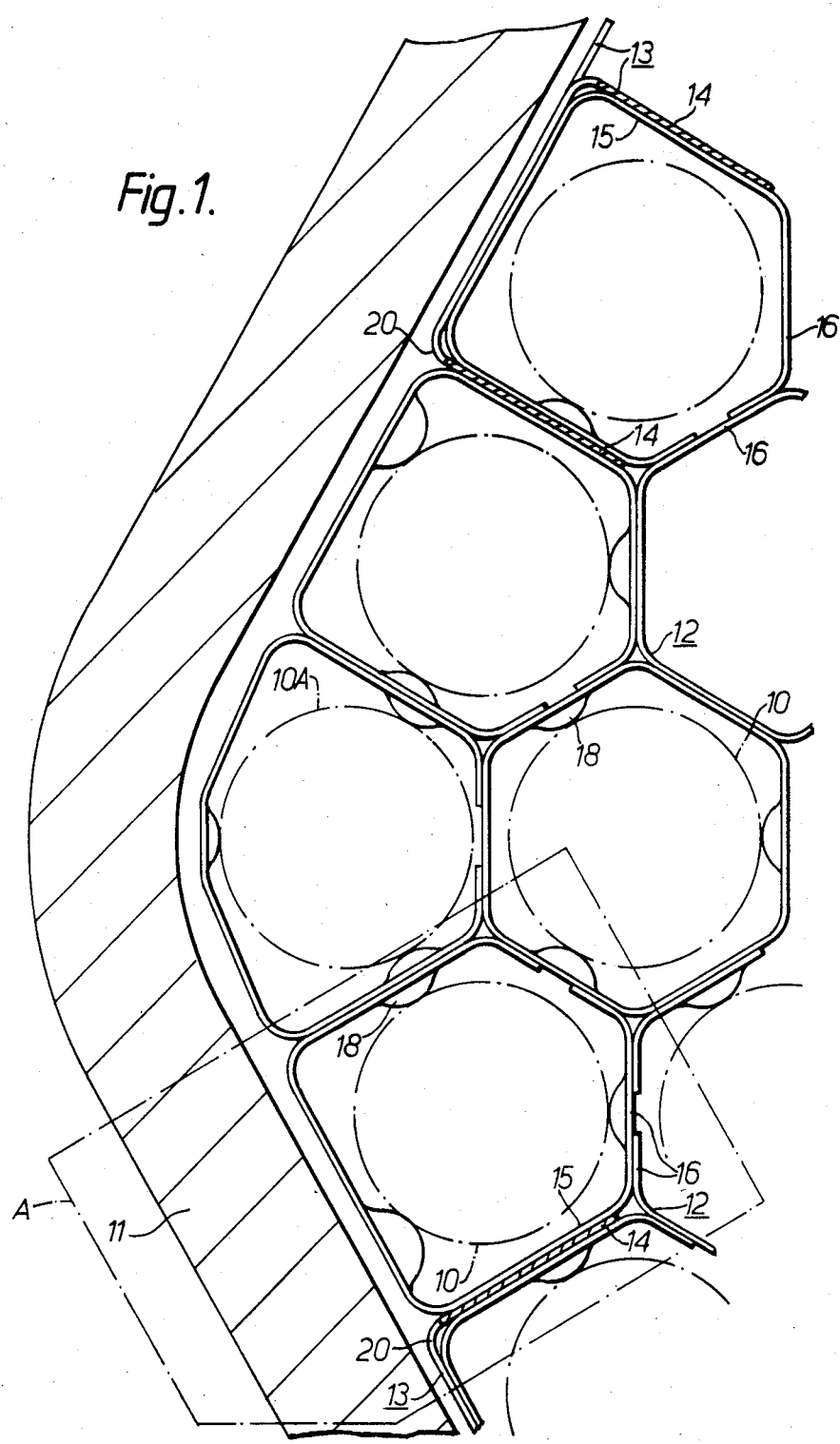

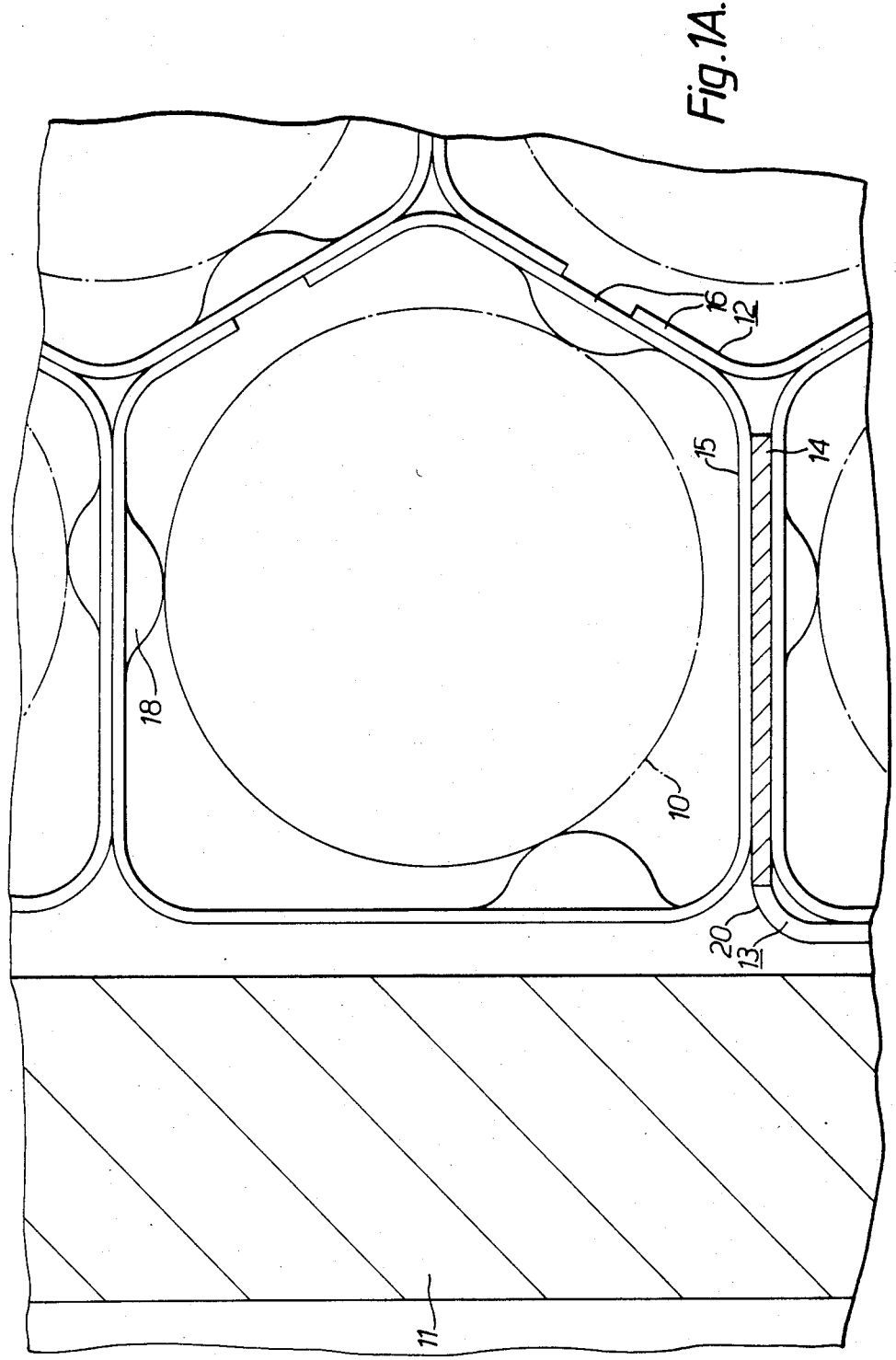

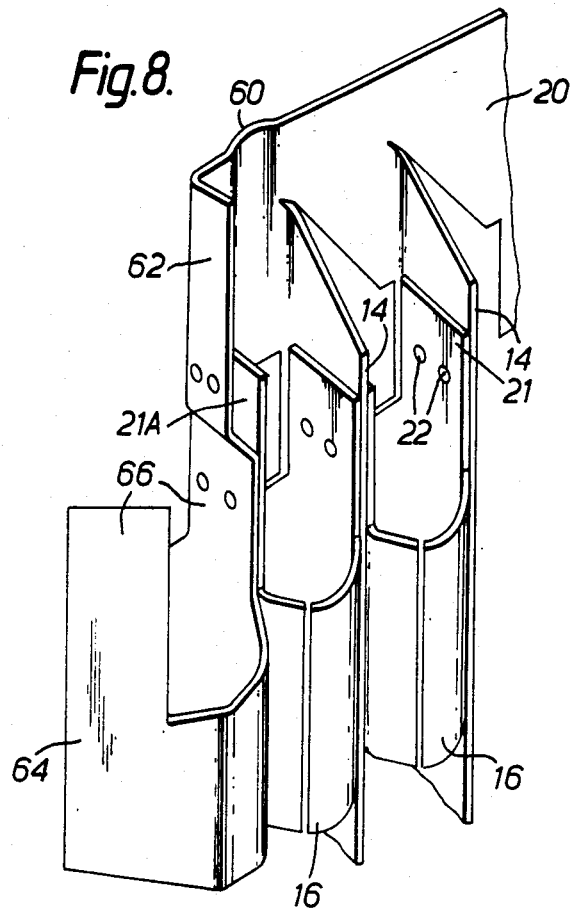

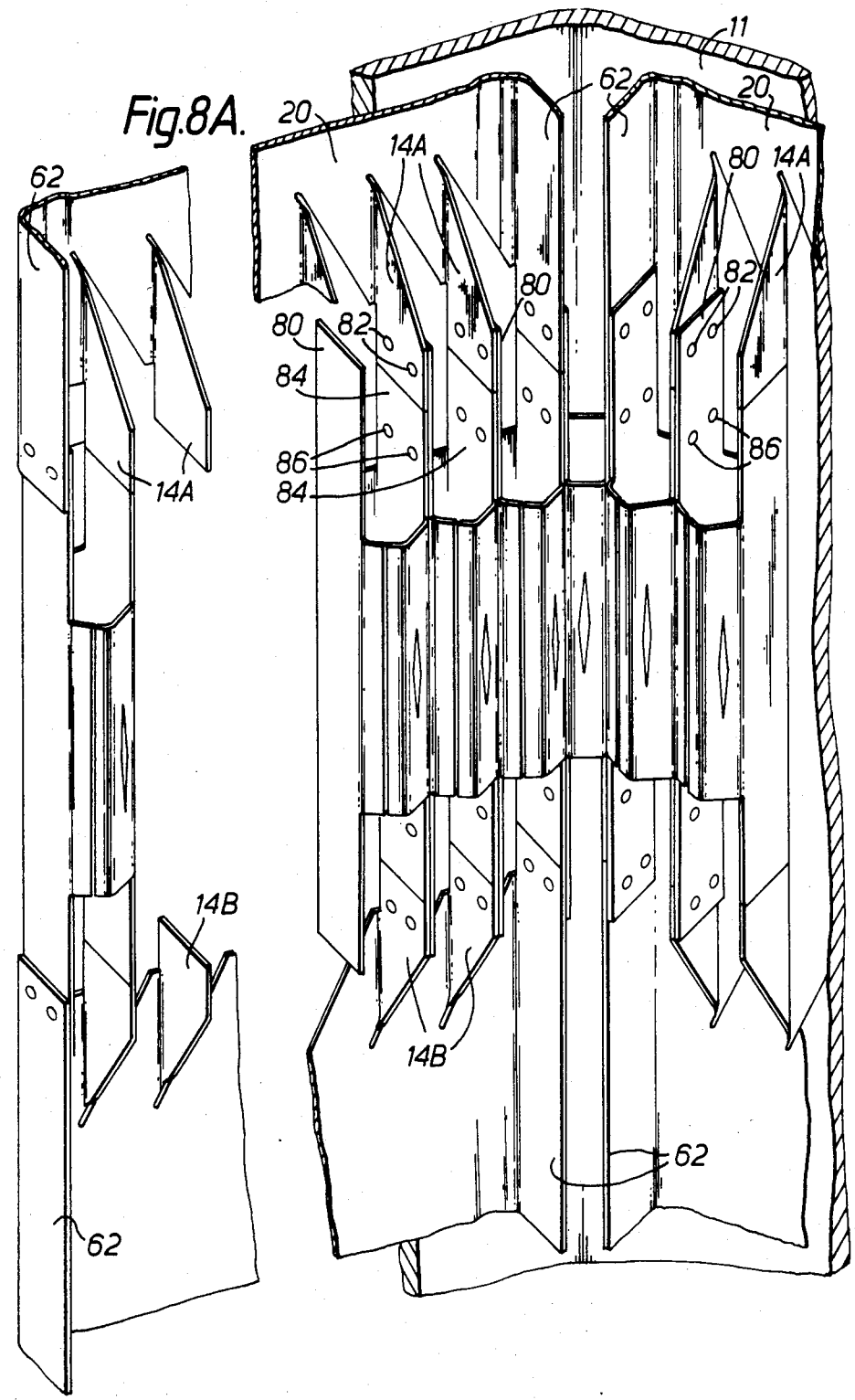

NUCLEAR REACTOR FUEL ASSEMBLIES

BACKGROUND OF THE INVENTION

This invention relates to nuclear reactor fuel assemblies and is concerned mainly with multi-pin fuel assemblies with the pins contained within a hexagonal tubular wrapper and stabilized by a series of spaced grids. Such assemblies find one use in liquid metal cooled fast reactors.

Conventionally, assemblies having a hexagonal wrapper do not have a fuel pin at the corners of the hexagonal shape. This is brought about as either cooling is difficult at this locality or the locality is required for structural members such as corner posts to hold the grids apart (see for example GB Pat. No. 2,079,033B, item 17 FIG. 2). There is a preference to have a fuel pin at this locality in order to maximize power output and the present invention aims to meet this preference.

Further, it is now being observed that a wrapper which serves only a shrouding function with a minimum load-bearing function can have advantages as it allows a wider choice of materials for the wrapper and in particular allows the choice of materials which do not retain good structural characteristics under irradiation. Such materials, for example those that embrittle seriously with irradiation, would previously have been rejected for use as they would not tolerate welding or drilling for joining with other members (such as grids).

It is known, in water-cooled reactors, to employ longitudinal support members for the fuel pin spacing members (see British Pat. No. 1137621) but these are located at the corners of the wrapper or outer casing and would be unacceptable in the kind of fuel assembly with which the present invention is concerned because coolant flow at the corners of a hexagonal array of fuel pins would be unduly restricted.

FEATURES AND ASPECTS OF THE INVENTION

The present invention seeks to provide a fuel assembly of the kind initially referred to with an improved pin support structure which permits the introduction of corner pins and enables the use of materials for the wrapper which would otherwise be problematic in situations requiring welding or mechanical fastening of grids to the wrapper at locations where neutron flux levels are high.

According to the present invention there is provided a nuclear reactor fuel assembly of the kind comprising multi-pins located in a wrapper of hexagonal cross-section and stabilised by a series of spaced grids of cellular structure, characterised in that a plurality of elements extend lengthwise of the wrapper at locations between the vertices of the wrapper and are secured to the grids to form with the grids a cage structure within the wrapper.

This arrangement involves no large cross-sectional area intrusions into the areas occupied by the grids and hence it becomes possible to have the full areas of the grids uniformly penetrated by fuel pins. In particular, the location of the elements between the vertices allows the use of corner pins without impeding coolant flow in the corner regions. The cage construction allows design creations in which access of welding electrodes for welding grid parts to cage is not problematical. The cage imposes only a very small and acceptable resistance to cooled flow through the assembly and very low turbulence. Weld designs can be chosen to have a high tolerance to tensile loads. The wrapper can be of a material having a low load bearing capacity.

The invention is of particular value with assemblies having grids with unit cells at the peripheries of the grid as these cells can be fabricated to have integral tabs or exposed other integral parts for welding to the upturned parts of the cage.

DESCRIPTION OF THE DRAWINGS

The invention will now be described further with reference to the accompanying drawing in which:

FIG. 1 is a diagrammatic sectional plan view of a part of a fuel assembly according to the invention;

Figure 1A is an enlarged fragment of FIG. 1 indicated by box A showing greater detail;

FIG. 8 is a fragmentary isometric view illustrating spot welding of grid edge and corner cells to the side limbs; and FIG. 8A is a similar view to that of FIG. 8 but illustrating a modification of the side limbs;

DESCRIPTION OF THE PREFERRED EMBODIMENTS

Figure 2:
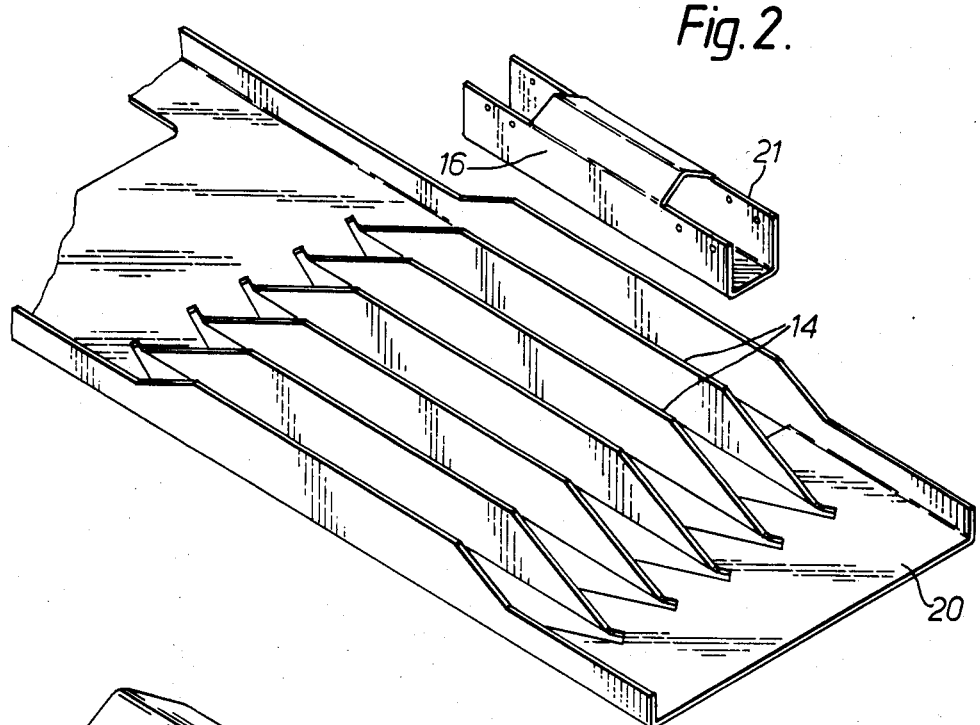
FIG. 2 is a perspective detail of a part of the cage of FIG. 1.

In FIGS. 1 and IA a nuclear reactor fuel assembly has multiple (typically 271) fuel pins 10 located in a hexagonal tubular wrapper 11 and stabilized by a series of spaced grids 12 (only one of which is indicated) and relative to which the pins 10 are slidable as a result of differential thermal expansion effects. The wrapper has an internal support cage 13 with upturned parts 14 which engage the walls 15 of unit cells 16 at the periphery of grid 12, the whole of the grid also being formed of unit cells, although not essentially.

In FIG. 1 one corner of the wrapper 11 is shown. This corner is free of the cage 13 and it is observed (in distinction from previous designs) that a fuel pin 10A is accommodated in the corner position. The fuel pins are located in the unit cells of the grid by dimples 18. The cage 13 is made up from six vertical limbs 20 integral with top and bottom collars.

In FIG. 2 one limb 20 of the cage 13 is shown. This also shows the upturned parts 14 and one displaced peripheral unit cell 16 for locating between two upturned parts 14. The cell 16 has tabs 21 which are used for spot welding the unit cell to the upturned parts.

Figure 3:
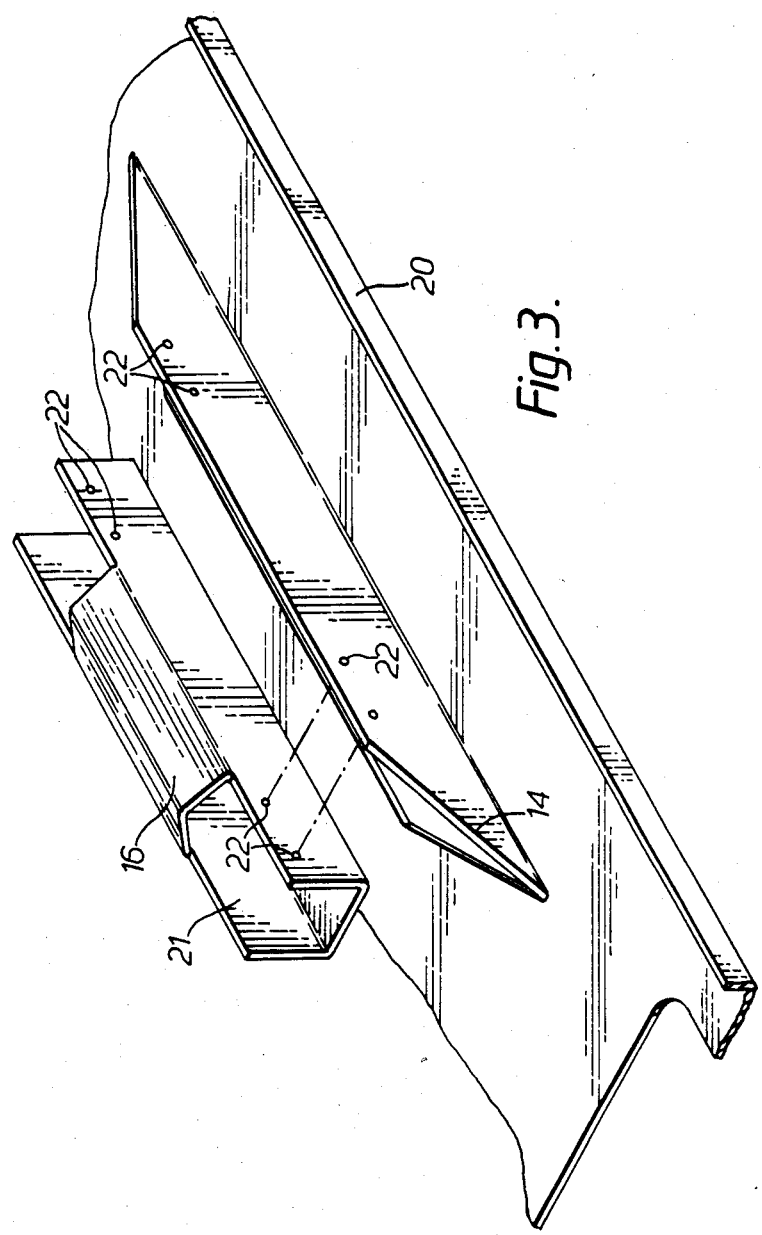
FIG. 3 is a simplified enlargement of a part of FIG. 2 showing a unit cell and part of a limb of a cage.

In FIG. 3 a limb 20 of the cage is shown but with only one upturned part 14. A single peripheral unit cell 16 with tabs 21 is "exploded" from the upturned part 14.

Spot welds 22 for joining tabs 21 and upturned parts 14 are indicated. Access for welding electrodes impose no problems and the welds formed have a good strength to tensile loads.

Figure 4:
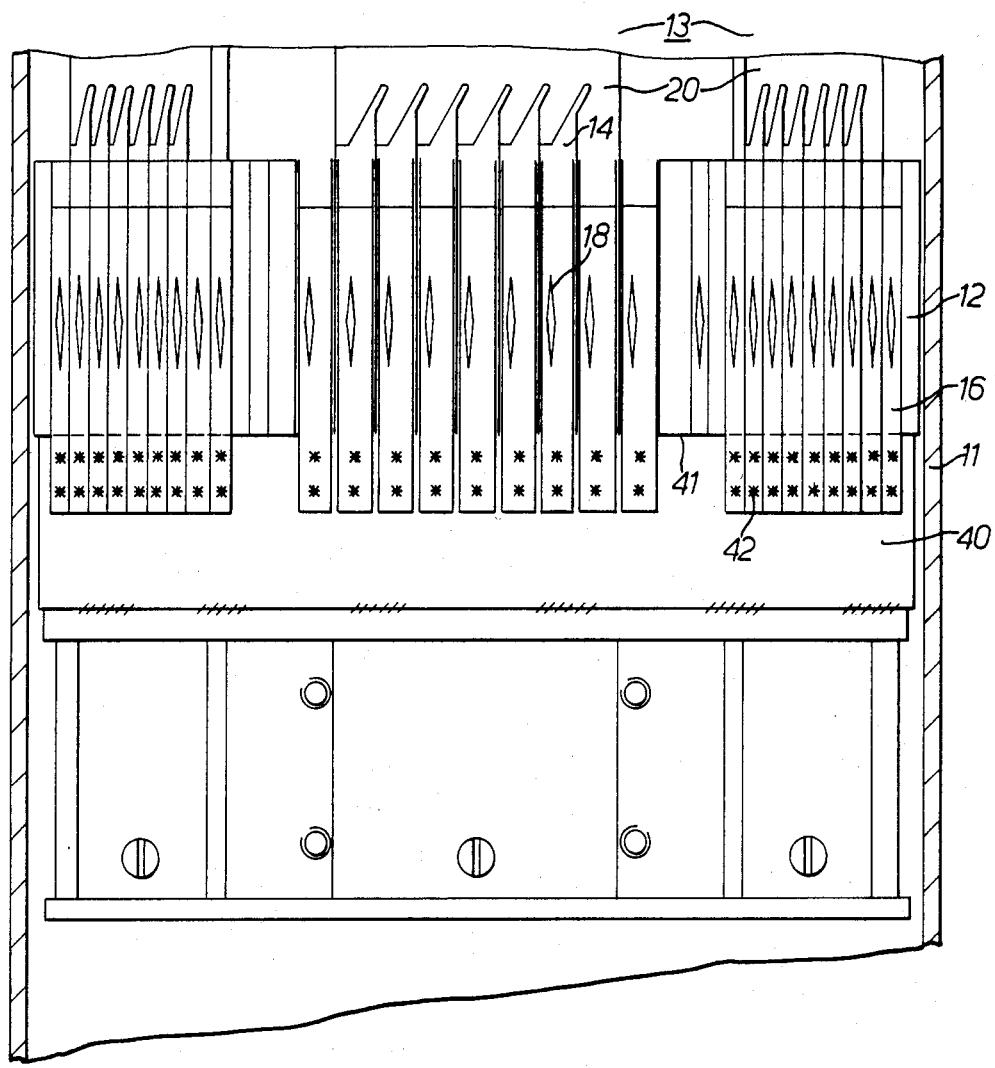
FIG. 4 is a sectional elevation at the lower end of the fuel assembly of FIG. 1 showing the attachment of the cage.

In FIG. 4 the lowermost grid 12 of the fuel assembly is shown spot welded 42 at its unit cells 16 to a bottom hold down grid 40 which is affixed within the wrapper 11, the lower ends of the fuel pins being anchored to the hold down grid 40. The limbs 20 of the cage 13 terminate at line 41 above which they are welded to tabs 21 of the cells of the lowermost grid 12. It will be noted that the only point of anchorage of the cage to the wrapper is at the lower end of the latter, ie. a position where the neutron flux is comparitively low and hence where irradiation embrittlement of the wrapper material is not a significant problem.

Figure 5:
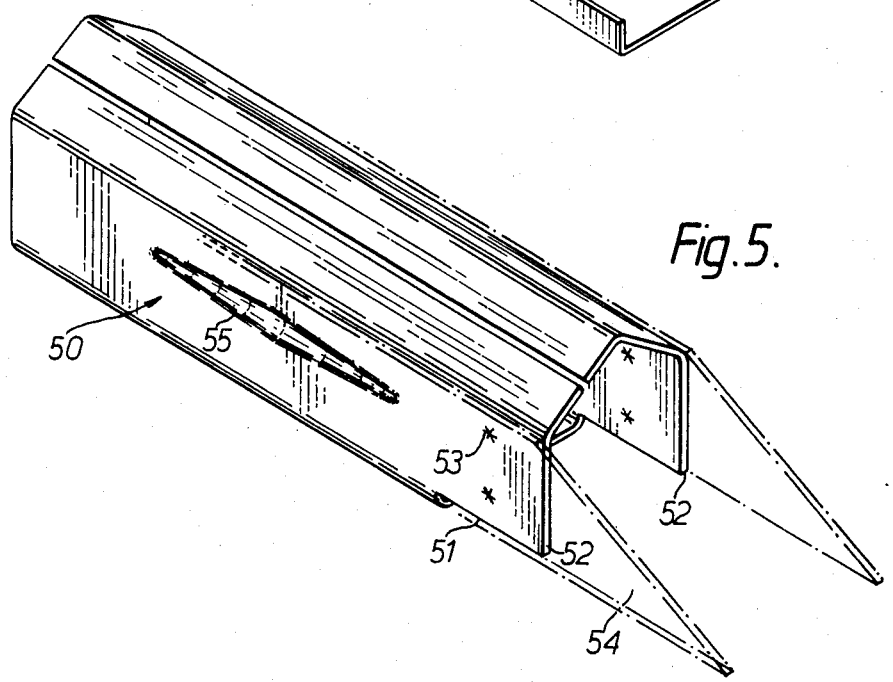
FIG. 5 is a perspective view of another form of unit cell.

In FIG. 5 a peripheral unit cell 50 (which may replace cells 16 of FIG. 3) has a cut-away part 51 which effectively produces a pair of joining tabs 52 at which welds 53 can be made to upturned parts 54. A dimple 55 (of which there are three) is shown in the cell wall to locate a fuel pin in the cell. The length dimension of the cell 50 is chosen to be the same as the depth of the grid in which it is located. This cell 50 allows use of existing grid welding equipment to weld the cell 50 to the upstands 54.

Figure 6:
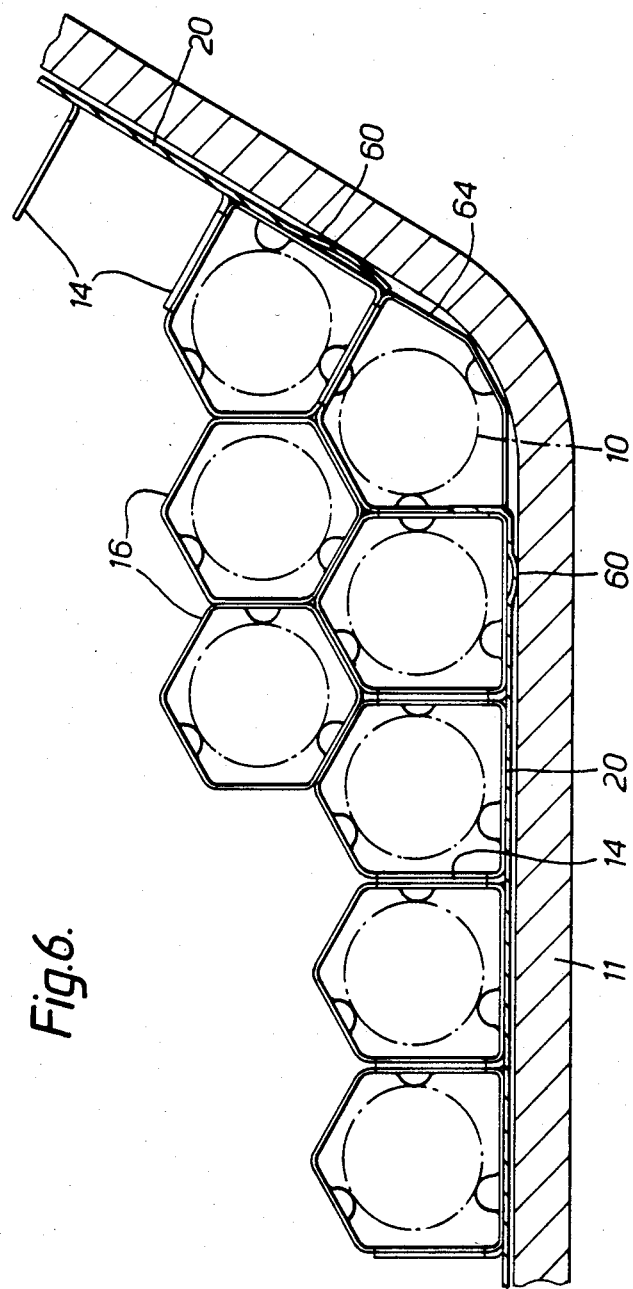
FIG. 6 is a similar view to that of FIG. 1 but showing a modified cage structure, like parts being depicted by the same reference numerals as in FIG. 1.
Figure 7:
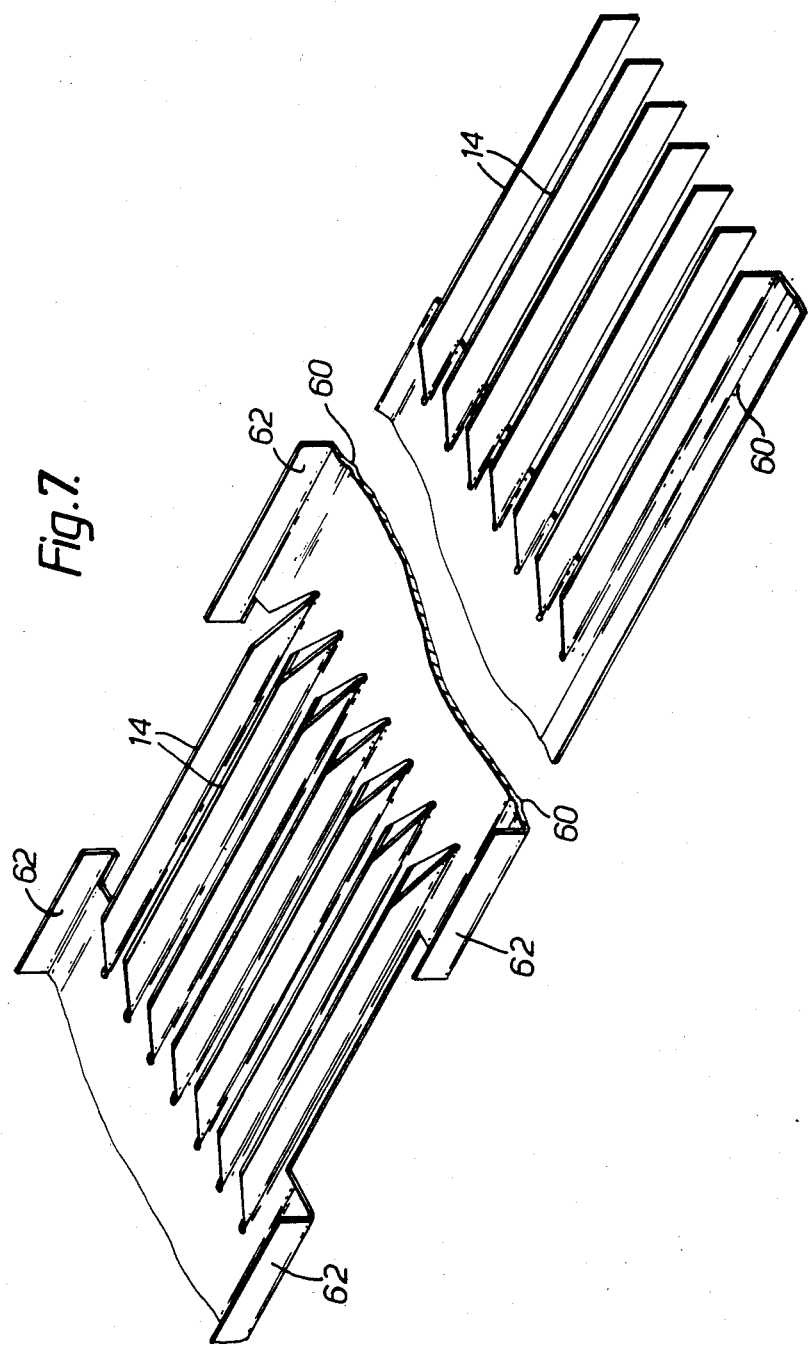
FIG. 7 is an isometric view of a side limb of the modified cage structure.

FIGS. 6-8 are concerned with a modified form of cage structure. In this embodiment, the limbs 20 of the cage are formed with elastically yieldable formations 60 which are arranged to bear against the internal faces of the wrapper and provide sprung lateral support for the cage within the wrapper. Thus, as shown, the formations 60 may comprise pressed indentations extending longitudinally of the side limb 20 adjacent the edges thereof.

The limbs 20 are also provided with flanges 62 at their edges for facilitating spot welding at the junctions between each corner cell 64 and the adjacent edge cells 16 each side thereof. As described previously, the edge cells 16 are provided with joining tabs 21 which are spot-welded at 22 to the upturned parts 14. At the corner/edge cell junctions, the edge cell and corner cell joining tabs 21A, 66 are of differing lengths so that one tab projects beyond the other and overlaps with the flange 52. This arrangement allows the spot welds 22A between the joining tabs 21A, 66 and the spot welds 68 between the joining tab 21A and flange 62 to be made through only double rather than triple thicknesses of material. A similar double thickness arrangement may be adopted between adjacent edge cells by producing them with different length joining tabs and by modifying the upturned parts 14 so that these only overlap the longer joining tabs. This is illustrated in FIG. 8A in which, it will be noted, the upturned parts 14 are interrupted so that the shorter sides of the edge cells can fit between the upper and lower parts 14A, 14B whereas the longer sides of the edge cells overlap the parts 14A, 14B. Thus, each longer joining tab 80 is spot welded at 82 to a respective part 14A or 14B whilst the shorter tab 84 is spot welded at 86 to the adjacent longer tab 80.

In each of the embodiments described above it will be seen that the parts 14 of each side limb 20 project inwardly of the wrapper and into the cellular structure of the grids without encroaching on the open cross-sections of the cells.

Although not shown in the drawings, those zones of the side limbs 20 extending between the sets of upturned parts 14 may be formed with strengthening ribs.

Figure 9:
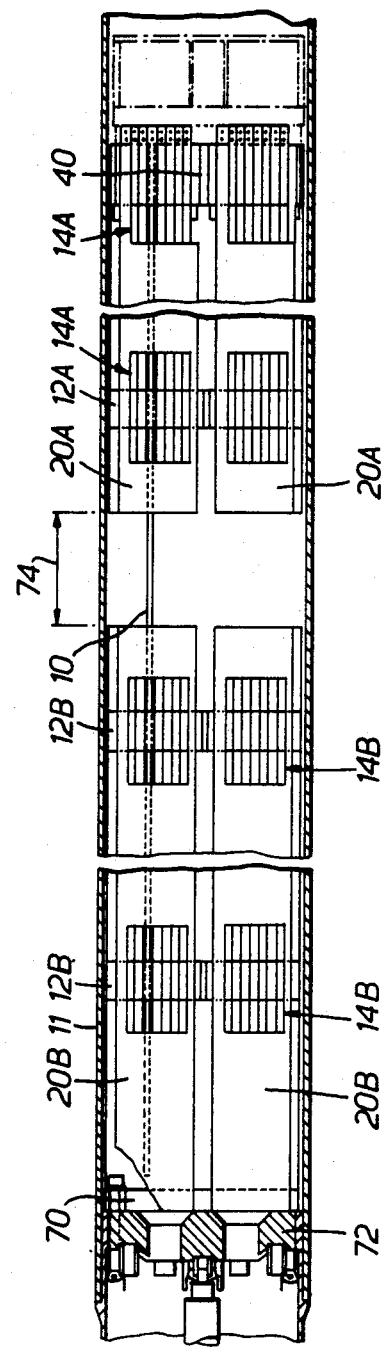
FIG. 9 is a diagrammatic longitudinal section view of a fuel assembly employing a two-part cage structure, like parts being depicted by the same reference numerals as in other Figures.

FIG. 9 illustrates another modification in which a two-part cage structure is employed: a lower cage including side limbs 20A and an upper cage including side limbs 20B. The lower cage is secured to the wrapper 11 by bottom support hold down grid 40 whereas the upper cage is secured by a support structure 70 located beneath a mixer pin support grid 72. The lower and upper cages are affixed to the wrapper at only their lower and upper ends respectively and are separated by a gap 74 for allowing differential expansion of the cages. In addition the gap provides a convenient location at which the wrapper 11 can be cut during subsequent dismantling of the sub-assembly for the purpose of reprocessing the irradiated fuel.

We claim:
1. A nuclear reactor fuel assembly of the kind comprising multi-pins located in a wrapper of hexagonal cross-section and stabilized by a series of spaced grids of cellular structure, characterized in that plurality of elements extend lengthwise of the wrapper at locations between the vertices of the wrapper and are secured to the grids to form with the grids a cage structure within the wrapper, and each element includes inwardly directed projections at each grid location which extend into overlapping relation with the cellular structure of each grid without encroaching on the open cross-secion of each cell.

2. An assembly as claimed in claim 1 in which each grid includes a pin accommodating cell at each vertex of the wrapper.

3. An assembly as claimed in claim 1 in which each element is in the form of an elongate plate and said inwardly directed projections are constituted by pressed out portions of the plate.

4. An assembly as claimed in claim 1 in which the edge cells of each grid are fomed with axially projecting tabs which are secured in face-to-face relation with said inwardly directed projections of said elements.

5. An assembly as claimed in claim 3 in which the edge cells of each grid are of unitary construction.

6. An assembly as claimed in claim 1 in which at least some of said elements are provided with elastically yieldable formations for bearing against the internal faces of the wrapper and provide lateral support for the cage within the wrapper.

7. An assembly as claimed in claim 1 in which said elements are anchored to the wrapper at only one axial location, the cage being free of connection to the wrapper over the remainder of the length of said elements.

8. An assembly as claimed in claim 1 in which there are two groups of said elements each associated with a respective set of grids so as to form two cage structures at successive axial locations within the grid.

9. An assembly as claimed in claim 8 in which said cage structures are separated by a gap.

10. An assembly as claimed in claim 8 in which each cage structure is anchored to the wrapper at the end remote from the other cage structure and is free of connection to the wrapper over the intervening space between the anchored ends of the cagte structures.

11. A nuclear reactor fuel assembly of the kind comprising multi-pins located in a wrapper of hexagonal cross-section and stabilised by a series of spaced grids of cellular structure, characterised in that a plurality of elements extend lengthwise of the wrapper at locations between the vertices of the wrapper and are secured to the grids to form with the grids a cage structure within the wrapper, and the cells at the periphery of each grid are formed with axially projecting tabs and the tabs of at least some adjacent cells are of differing length and are secured together to leave the longer length partially exposed, the exposed portion being in face-to-face relation with, and secured to, an inwardly directed projection of a respective element.

12. An assembly as claimed in claim 11 in which each grid includes a pin accommodating cell at each vertex of the wrapper.

13. An assembly as claimed in claim 11 in which the edge cells of each grid are of unitary construction.

14. An assembly as claimed in claim 11 in which at least some of said elements are provided with elastically yieldable formations for bearing against the internal faces of the wrapper and provide lateral support for the cage within the wrapper.

15. An assembly as claimed in claim 11 in which said elements are anchored to the wrapper at only one axial location, the cage being free of connection to the wrapper over the remainder of the length of said elements.

16. An assembly as claimed in claim 15 in which said cage structures are separated by a gap.

17. An assembly as claimed in claim 15 in which each cage structure is anchored to the wrapper at the end remote from the other cage structure and is free of connection to the wrapper over the intervening space between the anchored ends of the cage structures.

* * * * *

UNITED STATES PATENT AND TRADEMARK OFFICE
CERTIFICATE OF CORRECTION

PATENT NO. : 4,663,117
DATED : May 5, 1987
INVENTOR(S) : Robert Jolly and Colin E. Butterfield It is certified that error appears in the above—identified patent and that said Letters Patent is hereby corrected as shown below:

On the title page, the name of the assignee is corrected as follows:

--[73] Assignee: United Kingdom Atomic Energy Authority, London, England--

Signed and Sealed this

Twentieth Day of October, 1987

Attest:

DONALD J. QUIGG

Attesting Officer

Commissioner of Patents and Trademarks